Patented Jan. 3, 1928.

1,654,528

UNITED STATES PATENT OFFICE.

HARVEY M. BURKEY, OF PLAINFIELD, NEW JERSEY, ASSIGNOR TO AMERICAN METAL COMPANY, LTD., OF NEW YORK, N. Y., A CORPORATION OF NEW YORK.

PROCESS OF PRODUCING METALLIC ANTIMONY AND ALLOYS OF ANTIMONY AND ALKALI METAL ARSENATES.

No Drawing. Original application filed January 11, 1926, Serial No. 80,634. Divided and this application filed October 27, 1926. Serial No. 144,649.

This case is a division of my application Ser. No. 80,634, filed Jan. 11, 1926.

This invention relates to the production of metallic antimony and alloys containing antimony and alkali metal arsenates from crude materials containing antimony and arsenic. It is applicable particularly to the treatment of crude fumes derived from the treatment of ores containing antimony and arsenic. These fumes may be obtained from ores in which antimony or arsenic or both are the principal constituents or by roasting ores containing other constituents with small amounts of antimony, arsenic or both of these metals.

Fumes containing antimony and arsenic are produced in a number of metallurgical operations and have been treated heretofore in various ways to recover the valuable constituents. The methods used are relatively complicated and expensive. They do not permit, therefore, the most economical recovery of commercial products from the raw materials.

It is the object of the present invention to provide a simple and effective process of reducing antimony to a metallic form and of combining it if desired with other metals such as lead. The arsenic is likewise recovered in the form of an alkali metal arsenate which is a valuable commercial compound.

I have discovered that the reduction of antimony from antimony trioxide can be accomplished readily in a simple operation by mixing it with a suitable amount of arsenic trioxide and heating it in the presence of an alkali metal compound. When such a mixture is fused reactions occur which may be illustrated as follows:

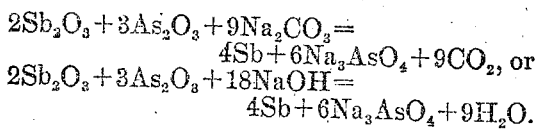

These reactions are examples merely and other alkali compounds including potassium compounds can be utilized therein. The necessary proportions of the reacting materials are determined by the molecular proportions in the reactions and consequently the amounts of the material to be introduced can be readily calculated.

In carrying out the invention the fume containing antimony and arsenic trioxides can be derived from any source. In some cases both antimony and arsenic are present in the fume but they are not likely to occur in the required proportions. In any event the mixture should be prepared to contain arsenic and antimony in the molecular proportions indicated by the reactions, and to this mixture the required amount of the alkali metal compound should be added. The mixture is then fused in a suitable crucible and upon the completion of the reaction the fusion will separate into two layers, one of which is molten metallic antimony at the bottom of the crucible. The alkali metal arsenate is in the upper layer together with any excess of the alkali metal compound and the two layers can be separately tapped from the crucible. The metallic antimony can be utilized for any desired purpose. The alkali metal arsenate is recovered by leaching and crystallization to separate the alkali metal arsenate from the excess of other alkali metal compounds.

In many commercial operations the amount of antimony trioxide available from natural sources may not be sufficient to convert all of the available arsenic trioxide in accordance with the reaction. In that event some of the recovered antimony can be converted into fume and returned to the process. It is not necessary, however, to convert the antimony into fume in a separate operation. The method can be applied by placing metallic antimony in the crucible together with the mixture containing arsenic trioxide and the alkali metal compound. The mass is then fused and the reaction proceeds as above indicated if some antimony trioxide is included in the mixture. When all of the antimony has separated air is blown into the crucible beneath the molten antimony to convert a portion thereof into antimony trioxide which rises and mixes with the overlying material containing arsenic trioxide and the alkali metal compound. The antimony is again reduced and an additional quantity of the arsenic trioxide is converted into the alkali metal arsenate. The blowing of air is continued until all of the arsenic trioxide has been converted. The layers are then permitted to separate so that the antimony can be withdrawn and the remaining mixture of alkali metal arsenate with the excess of other alkali metal compounds is reached and crystallized to recover the alkali metal arsenate and the other alkali metal compounds can be turned to the process.

In another embodiment of the invention the fusion is carried on in the presence of molten lead in the bottom of the crucible. A layer of the alkali metal compound, for example, caustic soda, is melted on the surface of the molten lead and the mixture of antimony and arsenic trioxide is fed gradually while the bath is stirred. The reaction proceeds with the separation of metallic antimony which settles and alloys with the lead forming hard lead which is suitable for many commercial uses. Alkali metal arsenate is dissolved in the overlying layer of alkali metal compound and the latter is withdrawn and leached to recover the alkali metal arsenate and the other alkali metal compounds.

In the practice of the invention I prefer to employ sodium compounds such as sodium carbonate or sodium hydroxide since these are most readily available and are comparatively inexpensive. It is not necessary to use a single compound and the process can be conducted, for example, with a mixture of sodium carbonate and sodium hydroxide or, for example, with a mixture of sodium hydroxide and sodium chloride. Any other salt can be used as a carrier so long as it will form a fusible slag with the alkali metal arsenate at the working temperature and will not interfere with the recovery of the alkali metal arsenate by leaching and crystallization.

Any suitable apparatus can be employed in conducting the process, for example, a reverberatory furnace or suitable crucible for the production of metallic antimony or an iron crucible or pot for the production of hard lead when using a bath of lead and fused caustic. The reverberatory furnace or crucible can be heated as usual in the art to the temperature required which is above the melting point of lead.

In the simplest application of the invention a mixture of antimony trioxide and arsenic trioxide with the required proportion of sodium carbonate and preferably an excess of the latter is fused in the crucible and heating is continued until the reaction is complete. If the materials are introduced in the proper proportions as indicated by the reaction practically all of the antimony will separate as metallic antimony and all of the arsenic will be retained in the form of sodium arsenate and can be recovered readily from the excess of sodium carbonate.

As hereinbefore indicated, the antimony trioxide can be derived from any source, for example, by fuming some of the antimony recovered in the process either directly in the crucible by the introduction of air or in a separate operation. If the antimony trioxide is produced directly in the crucible it is necessary to provide a sufficient supply of metallic antimony and to introduce air in suitable quantity to ensure the oxidation thereof. The reaction is completed most rapidly when the oxidation of the antimony is active, and if the amount of air introduced is not sufficient the operation will be prolonged but the separation will be complete ultimately if the air is blown into the crucible for a sufficient period of time.

In preparing alloys of antimony by the process described, I prefer to use sodium hydroxide. A considerable excess of this material should be melted on a bath of molten lead, for example, in the crucible and the mixture of antimony and arsenic trioxides should be introduced then gradually to the molten layer of sodium hydroxide with continued stirring to ensure distribution and consequent activity of the reaction. The amount of antimony which is separated and alloyed with the lead will depend upon the amount originally present in the mixture introduced and upon the time during which the lead is permitted to remain in the crucible. The lead can be withdrawn when it contains the desired amount of antimony and more lead can be added to permit the completion of the reaction and incidentally to produce further quantities of the lead alloy.

While the process as described is adapted particularly for the treatment of fumes derived from ores containing antimony and arsenic, it may be utilized in converting antimony and arsenic compounds respectively into metallic antimony or alloys of antimony and alkali metal arsenates. Thus, antimony and arsenic compounds can be roasted and oxidized to produce the trioxides which are available for use in the process as described.

Various changes can be made in the details of the operation without departing from the invention or sacrificing any of the advantages thereof.

I claim:—

1. The process which comprises combining the trioxides of antimony and arsenic in the presence of a fused alkali metal compound and a metal adapted to alloy with the antimony.

2. The process which comprises combining the trioxides of antimony and arsenic in the presence of a fused alkali metal compound and molten lead.

3. The process which comprises combining the trioxides of antimony and arsenic in the presence of a fused alkali metal compound and a metal adapted to alloy with the antimony and separating the metal containing the antimony from the fusion.

4. The process which comprises combining the trioxides of antimony and arsenic in the presence of a fused alkali metal compound and molten lead and separating the lead containing the antimony from the fusion.

5. The process which comprises adding a mixture of antimony and arsenic trioxides to a fused alkali metal compound in the presence of a metal which is adapted to alloy with the antimony.

6. The process which comprises reducing antimony trioxide by the action of arsenic trioxide in the presence of an alkali metal compound and permitting the antimony to alloy directly with a molten metal.

In testimony whereof I affix my signature.

HARVEY M. BURKEY.